United States Patent
Martins Junior et al.

(10) Patent No.: US 12,319,756 B2
(45) Date of Patent: Jun. 3, 2025

(54) PROPYLENE PRELIMINARY POLYMERIZATION

(71) Applicant: Braskem S.A., Camaçari (BR)

(72) Inventors: Olavo Martins Junior, São Paulo (BR); Dihogenes Adriano Pozzer, São Paulo (BR); Élita Cavalli, São Paulo (BR); Thiago Roberto Almeida, São Paulo (BR); Bryan Dawson, São Paulo (BR)

(73) Assignee: BRASKEM S. A., Camacari (BR)

( * ) Notice: Subject to any disclaimer, the term of this patent is extended or adjusted under 35 U.S.C. 154(b) by 0 days.

(21) Appl. No.: 17/850,489

(22) Filed: Jun. 27, 2022

(65) Prior Publication Data

US 2022/0411545 A1 Dec. 29, 2022

Related U.S. Application Data

(60) Provisional application No. 63/215,273, filed on Jun. 25, 2021.

(51) Int. Cl.
*C08F 2/01* (2006.01)
*C08F 2/02* (2006.01)
(Continued)

(52) U.S. Cl.
CPC ............. *C08F 110/06* (2013.01); *C08F 2/01* (2013.01); *C08F 2/02* (2013.01); *C08F 4/65912* (2013.01); *C08F 4/654* (2013.01); *C08F 4/655* (2013.01)

(58) Field of Classification Search
CPC ........ C08F 110/06; C08F 4/654; C08F 4/655; C08F 2/01; C08F 2/02
See application file for complete search history.

(56) References Cited

U.S. PATENT DOCUMENTS

| | | |
|---|---|---|
| 3,922,322 A | 11/1975 | Roger et al. |
| 4,035,560 A | 7/1977 | Caumartin et al. |

(Continued)

FOREIGN PATENT DOCUMENTS

| | | |
|---|---|---|
| EP | 0050477 B1 | 1/1985 |
| EP | 2046846 B1 | 5/2011 |

(Continued)

OTHER PUBLICATIONS

International Search Report issued in corresponding International Application No. PCT/IB2022/020050 mailed Nov. 22, 2022 (8 pages).

(Continued)

*Primary Examiner* — Caixia Lu
(74) *Attorney, Agent, or Firm* — Traister LLC; Patrick Traister (57) ABSTRACT

A process for propylene preliminary polymerization in liquid phase that occurs in a continuous preliminary polymerization reactor may include feeding a propylene monomer and a Ziegler-Natta catalyst system having (a) a pro-catalyst having an internal electron donor comprising a substituted phenylene aromatic diester, (b) a catalyst activator and optionally (c) an external donor, into the continuous preliminary polymerization reactor, wherein the feeding is carried out without pre-contact of the pro-catalyst with the catalyst activator, and also without pre-contact of the catalyst activator with the propylene monomer before entering the continuous preliminary polymerization reactor.

17 Claims, 5 Drawing Sheets

(51) Int. Cl.
    *C08F 4/654*     (2006.01)
    *C08F 4/655*     (2006.01)
    *C08F 4/659*     (2006.01)
    *C08F 110/06*    (2006.01)

(56) References Cited

U.S. PATENT DOCUMENTS

| | | | |
|---|---|---|---|
| 4,588,790 | A | 5/1986 | Jenkins, III et al. |
| 7,329,714 | B2 | 2/2008 | Lee et al. |
| 7,678,867 | B2 | 3/2010 | Baita et al. |
| 8,017,704 | B2 | 9/2011 | Leskinen et al. |
| 9,068,028 | B2 | 6/2015 | Collina et al. |
| 9,512,246 | B2 | 12/2016 | Neissl et al. |
| 9,605,096 | B2 | 3/2017 | Edwards et al. |
| 9,751,965 | B2 | 9/2017 | Yu et al. |
| 10,059,784 | B2 | 8/2018 | Van Egmond |
| 10,364,310 | B2 | 7/2019 | Sumerin et al. |
| 11,807,655 | B2 | 11/2023 | Toeltsch et al. |
| 2004/0116625 | A1* | 6/2004 | Hottovy ............... B01J 19/1837 422/131 |
| 2007/0140934 | A1* | 6/2007 | Okamura ................ B01J 8/20 422/232 |
| 2014/0121337 | A1* | 5/2014 | Yu .......................... C08F 210/06 526/348 |
| 2016/0280808 | A1* | 9/2016 | Chen .................... C08F 4/6494 |
| 2017/0313797 | A1* | 11/2017 | Klimke ................... C08L 23/12 |
| 2020/0181297 | A1* | 6/2020 | Arakawa ............... C08F 110/06 |

FOREIGN PATENT DOCUMENTS

| | | |
|---|---|---|
| WO | 2010078479 A1 | 7/2010 |
| WO | 2018191212 A1 | 10/2018 |
| WO | WO-2019090882 A1 * | 5/2019 |

OTHER PUBLICATIONS

Written Opinion issued in corresponding International Application No. PCT/IB2022/020050, mailed Nov. 22, 2022 (15 pages).

Levenspiel, Octave; "Chemical Reaction Engineering, Third Edition"; Chapter 20: Reactors with Suspended Solid Catalyst, Fluidized Reactors of Various Types; pp. 447-541; John Wiley & Sons; New York; 1999 (7 pages).

* cited by examiner

PROPYLENE PRELIMINARY POLYMERIZATION

BACKGROUND

Preliminary polymerization is a process step that occurs prior to a polymerization step. It is characterized as occurring under milder process conditions, with lower monomer concentration and/or lower temperature, in order to have a lower polymerization rate and consequently lower heat generation. During the preliminary polymerization step, activation of sites occurs, increasing the catalyst activity. As it occurs under milder conditions, preliminary polymerization enables the formation of new active sites and the activation of dormant/inactive sites. Preliminary polymerization allows a more controlled initiation, with regular fragmentation of the catalyst, leading to increased bulk density, improved morphology of the product formed, and decreased the fines polymer particles generation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for propylene preliminary polymerization in liquid phase that occurs in a continuous preliminary polymerization reactor, that includes feeding a propylene monomer and a Ziegler-Natta catalyst system of (a) a pro-catalyst having an internal electron donor comprising a substituted phenylene aromatic diester, (b) a catalyst activator and optionally (c) an external donor, into the continuous preliminary polymerization reactor, wherein the feeding is carried out without pre-contact of the pro-catalyst with the catalyst activator, and also without pre-contact of the catalyst activator with the propylene monomer before entering the continuous preliminary polymerization reactor.

In another aspect, embodiments disclosed herein relate to a process for propylene preliminary polymerization, that includes feeding a propylene monomer and a Ziegler-Natta catalyst system of (a) a pro-catalyst having an internal electron donor comprising a substituted phenylene aromatic diester, (b) a catalyst activator and optionally (c) an external donor into a preliminary polymerization reactor, where the feeding is carried out without pre-contact of the pro-catalyst with a catalyst activator, and also without pre-contact of the catalyst activator with the propylene monomer before entering the continuous preliminary polymerization reactor, wherein a feeding zone of the preliminary polymerization reactor has:
  a maximum polymer concentration at least 58% lower than the maximum polymer concentration in the preliminary polymerization reactor;
  a maximum Ziegler-Natta catalyst concentration at least 58% lower than the maximum Ziegler-Natta catalyst concentration in the preliminary polymerization reactor; and
  a maximum temperature at least 47% lower than the maximum temperature in the preliminary polymerization reactor.

In another aspect, embodiments disclosed herein relate to a preliminary polymer composition that includes a preliminary polymerized Ziegler-Natta pro-catalyst having an internal electron donor comprising a substituted phenylene aromatic diester, wherein the preliminary polymerized Ziegler-Natta pro-catalyst has an average particle size ranging from 60 to 180 µm.

In another aspect, embodiments disclosed herein relate to a preliminary polymer composition produced by a process for propylene preliminary polymerization in liquid phase that occurs in a continuous preliminary polymerization reactor, that includes feeding a propylene monomer and a Ziegler-Natta catalyst system of (a) a pro-catalyst having an internal electron donor comprising a substituted phenylene aromatic diester, (b) a catalyst activator and optionally (c) an external donor, into the continuous preliminary polymerization reactor, wherein the feeding is carried out without pre-contact of the pro-catalyst with the catalyst activator, and also without pre-contact of the catalyst activator with the propylene monomer before entering the continuous preliminary polymerization reactor.

In yet another aspect, embodiments disclosed herein relate to a preliminary polymer composition produced by a process for propylene preliminary polymerization, that includes feeding a propylene monomer and a Ziegler-Natta catalyst system of (a) a pro-catalyst having an internal electron donor comprising a substituted phenylene aromatic diester, (b) a catalyst activator and optionally (c) an external donor into a preliminary polymerization reactor, where the feeding is carried out without pre-contact of the pro-catalyst with a catalyst activator, and also without pre-contact of the catalyst activator with the propylene monomer before entering the continuous preliminary polymerization reactor, wherein a feeding zone of the preliminary polymerization reactor has:
  a maximum polymer concentration at least 58% lower than the maximum polymer concentration in the preliminary polymerization reactor;
  a maximum Ziegler-Natta catalyst concentration at least 58% lower than the maximum Ziegler-Natta catalyst concentration in the preliminary polymerization reactor; and
  a maximum temperature at least 47% lower than the maximum temperature in the preliminary polymerization reactor.

In yet another aspect, embodiments disclosed herein relate to an apparatus for feeding a catalyst system into a preliminary polymerization reactor, that includes a catalyst feed tube for feeding at least a catalyst component; and an annular section formed between an internal tube wall and an external tube wall, and that surrounds the catalyst feed tube for feeding monomer, such that the catalyst feed tube and annular section do not allow pre-contact of the catalyst component with the monomer before entering the preliminary polymerization reactor, wherein: the annular section has a width ranging from 1.0 to 2.0 mm; the external tube wall advances 19-21 mm into the preliminary polymerization reactor; the internal tube wall advances 9-11 mm less than the external tube wall.

In yet another aspect, embodiments disclosed herein relate to a preliminary polymerization reactor, that includes a first apparatus attached to a wall of the preliminary polymerization reactor, the first apparatus having a first catalyst feed tube for feeding a pro-catalyst into the preliminary polymerization reactor; and a first annular section for feeding monomer formed between an internal tube wall and an external tube wall, and that surrounds the catalyst feed tube, such that the catalyst feed tube and annular section do not allow pre-contact of the pro-catalyst with the monomer before entering the preliminary polymerization reactor; and a second apparatus attached to the wall of the preliminary polymerization reactor, the second apparatus having a second catalyst feed tube for feeding a catalyst activator and optionally an external electron donor into the preliminary polymerization reactor; and a second annular section for feeding monomer formed between an internal tube wall and an external tube wall, and that surrounds the catalyst feed tube, such that the catalyst feed tube and annular section do not allow pre-contact of the catalyst activator and optional external electron donor with the monomer before entering the preliminary polymerization reactor.

In yet another aspect, embodiments disclosed herein relate to a preliminary polymerization reactor that includes a feed tube for feeding a stream comprising a pro-catalyst and propylene monomer into the preliminary polymerization reactor; and an apparatus attached to the wall of the preliminary polymerization reactor, the apparatus including a catalyst feed tube for feeding a catalyst activator and optionally an external electron donor into the preliminary polymerization reactor; and a annular section for feeding monomer formed between an internal tube wall and an external tube wall, and that surrounds the catalyst feed tube, such that the catalyst feed tube and annular section do not allow pre-contact of the catalyst activator and optional external electron donor with the monomer before entering the preliminary polymerization reactor.

Other aspects and advantages of the claimed subject matter will be apparent from the following description and the appended claims.

DETAILED DESCRIPTION

Embodiments disclosed herein generally relate to preliminary polymerizations using a Ziegler-Natta catalyst system comprising a substituted phenylene aromatic diester as internal donor, and preliminary polymers formed therefrom, specifically propylene preliminary polymers. In particular, embodiments disclosed herein also relate to feeding of such catalyst system to a preliminary polymerization reactor using a specific apparatus at high velocity, thereby not allowing contact of catalyst components such as pro-catalysts, catalyst activators and optionally external donors with monomers before entering into the preliminary polymerization reactor.

Catalyst System

In one or more embodiments, the catalyst system comprises any high-activity Ziegler-Natta catalyst system in which the internal electron donor comprises a substituted phenylene aromatic diester. As defined herein, a high-activity Ziegler-Natta pro-catalyst has an activity of at least 30 kg polypropylene/g catalyst in the polymerization reactor.

For example, the Ziegler-Natta catalyst system may include the following catalyst components (a) a pro-catalyst that has a transition metal compound, a compound of a metal selected from groups 1 to 3 of the periodic table, and an internal electron donor, (b) a co-catalyst (also referred as "catalyst activator"), and optionally (c) an external electron donor.

The pro-catalyst may include, for example, a magnesium halide and a transition metal compound, such as $TiCl_4$. These compounds may optionally be supported on a particulate support, such as inorganic oxide, like silica or alumina, or the magnesium halide itself may form the solid support. Specifically, in one or more embodiments, $TiCl_4$ and the internal electron donor may be co-adsorbed on a $MgCl_2$ support.

As mentioned above, the internal electron donor may include substituted phenylene aromatic diester. In one or more embodiments, the substituted phenylene aromatic diester may be a substituted 1,2-phenylene aromatic diester, a substituted 1,3-phenylene aromatic diester, or 1,4-phenylene aromatic diester.

In one or more embodiments, the pro-catalyst may comprise an additional internal electron donor component such as benzoates. Suitable benzoate groups include ethyl benzoate, methyl benzoate, ethyl p-methoxybenzoate, methyl p-ethoxybenzoate, ethyl p-ethoxybenzoate, ethyl p-chlorobenzoate. In particular, the benzoate may be ethyl benzoate and/or methoxypropan-2-yl benzoate.

The pro-catalyst may be activated by the co-catalyst and complexed with an external electron donor.

The Ziegler-Natta catalyst system may also comprise a catalyst activator. Suitable catalyst activators may include trimethylaluminum, triethylaluminum, tri-isobutylaluminum, and tri-n-hexylaluminum, among others. In particular, the catalyst activator may be triethylaluminum (TEAL). In one or more embodiments, the molar ratio of aluminum to titanium may range from a lower limit of any of 5:1, 10:1, 25:1, or 50:1 to an upper limit of any of 100:1, 250:1, or 500:1, where any lower limit can be used in combination with any upper limit.

The Ziegler-Natta catalyst system composition may include an external electron donor. The external electron donor may be selected from a silicon compound, a bidentate compound, an amine, an ether, a carboxylate, a ketone, an amide, a carbamate. A phosphine, a phosphate, a phosphite, a sulfonate, a sulfoxide, and a combination thereof.

The Ziegler-Natta catalyst may be used as a stable suspension in order to enable the transfer to the preliminary polymerization reactor. For example, the suspension may be a mixture of the Ziegler-Natta catalyst system with a saturated hydrocarbon such as mineral oil.

In one or more embodiments, the Ziegler-Natta catalyst (mixed in a saturated hydrocarbon) may have a total intrusion volume up to 1 mL/g, a total pore area of up to 10 m$^2$/g, and an apparent skeletal density from 1.6 to 2.1 g/mL.

In one or more embodiments, the preliminary polymerized Ziegler-Natta catalyst may comprise an average particle size ranging from 60 to 180 μm.

Catalyst Feeding

In one or more embodiments, the preliminary polymerization occurs without a pre-contact between the pro-catalyst and the catalyst activator, and/or without a pre-contact between the catalyst activator and monomer.

In some embodiments, the preliminary polymerization occurs without pre-contact of the pro-catalyst and propylene monomer. In an alternative embodiment, the preliminary polymerization occurs with pre-contact of the pro-catalyst and propylene monomer (e.g. the pro-catalyst and propylene monomer may be fed in a single stream).

One or more embodiments are directed to the use of a specific apparatus for feeding the catalyst system components (such as pro-catalyst, catalyst activator and optional external electron donor) and monomer, which does not allow pre-contact of the catalyst components and monomer before entering the preliminary polymerization reactor.

In one or more embodiments, the inlet velocity of each of the pro-catalyst, the catalyst activator (and optionally the electron donor), and the monomer in the preliminary polymerization reactor is greater than 1.5 m/s or even 2 m/s, such as between 4 and 5 m/s.

Figure 1:
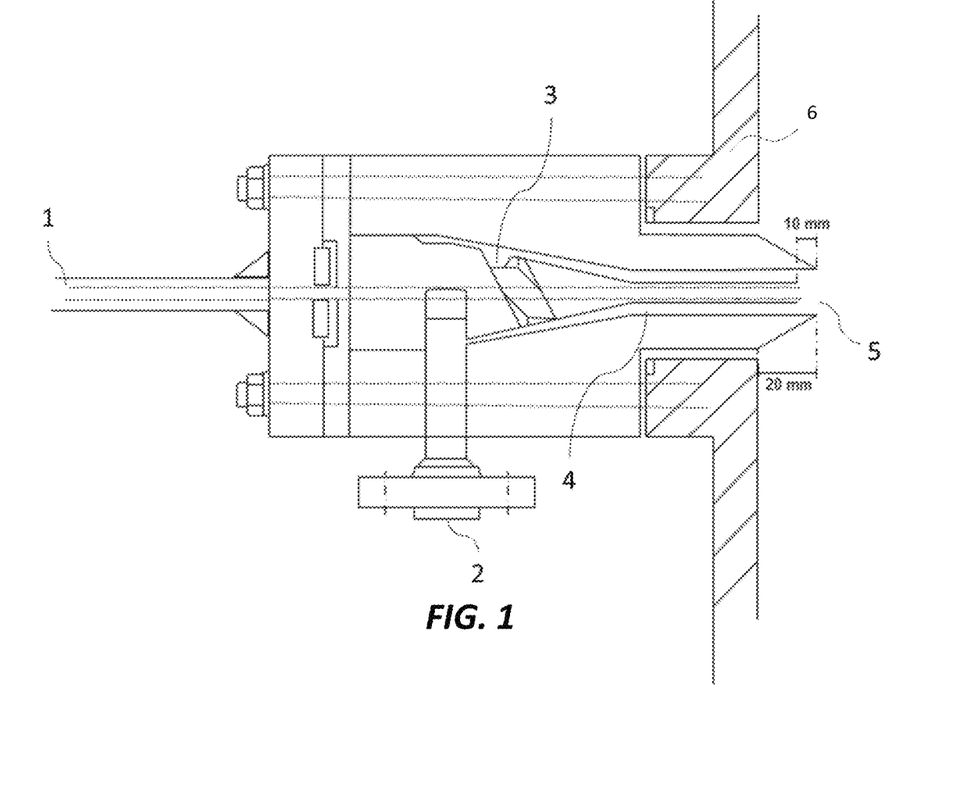
FIG. 1 shows an apparatus for feeding a catalytic system into to a preliminary polymerization reactor.
Figure 2:
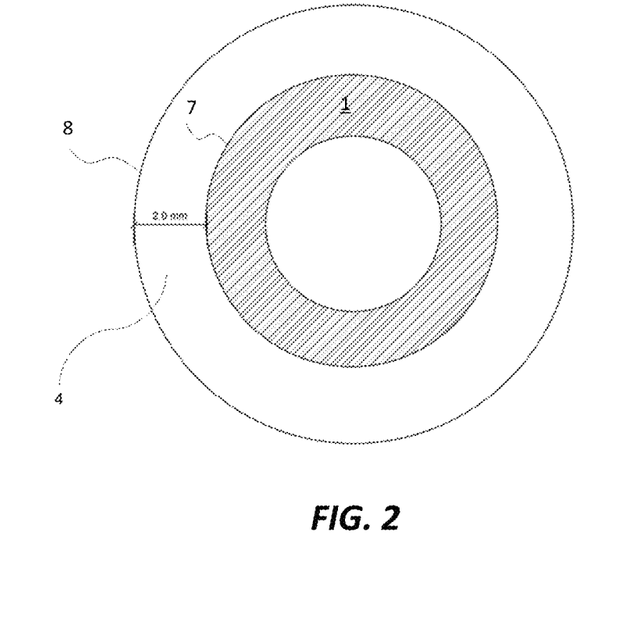
FIG. 2 shows the frontal view of the annular section of the apparatus shown in FIG. 1.

Referring now to FIGS. 1-2, FIG. 1 shows an embodiment of an apparatus developed for feeding the catalytic system into a preliminary polymerization reactor, and FIG. 2 shows a frontal view of the annular section of such apparatus.

In the apparatus shown in FIGS. 1 and 2, the catalyst system components are fed to the preliminary polymerization reactor 6 (not shown in detail) via a feed tube 1. The feed tube 1 extends up to the inlet 5 of the preliminary polymerization reactor 6, ensuring that the Ziegler-Natta catalyst system components do not have prior contact with monomer.

A monomer supply line is connected to flange 2 and enters into the apparatus from the side. The apparatus has grooves 3 in the passage section for the fed monomer. When entering the apparatus, the monomer passes through the grooves 3 which generate increased turbulence and formation of a monomer vortex. The monomer passes through an annular section 4, which, because of its smaller area, allows the monomer feed stream to achieve higher speeds at the inlet 5 of the preliminary polymerization reactor 6. The entrance of the catalyst components into the preliminary polymerization reactor 6 occurs with sufficient speed to avoid the formation of a zone of higher concentration of any catalytic component and thus avoid hot spots at the inlet region of the preliminary polymerization reactor.

In one or more embodiments, the feeding zone through which the catalyst system components, with no previous contact with the monomer, are fed may have a maximum polymer concentration at least 55%, or at least 58%, lower than the maximum polymer concentration of the highest solids concentration region in the preliminary polymerization reactor. As used herein, the feeding zone is the inlet of the preliminary polymerization reactor from the apparatus and is limited to a control volume of no more than of 0.014 m³ of the preliminary polymerization reactor.

In one or more embodiments, the feeding zone through the catalyst system components, with no previous contact with the monomer, are fed may present a maximum Ziegler-Natta catalyst concentration at least 55%, or at least 58%, lower than the maximum Ziegler-Natta catalyst concentration of the highest catalyst concentration region in the preliminary polymerization reactor.

In one or more embodiments, the feeding zone through which the catalyst system components, with no previous contact with the monomer, are fed may present a maximum temperature at least 45%, or at least 47%, lower than the maximum temperature of the preliminary polymerization reactor.

Referring now to FIG. 2, the annular section 4, through which the monomer stream flows to be fed to the preliminary polymerization reactor (not shown in FIG. 2), has a width of 1.0 to 2.0 mm between the inner tube wall 7 and the external tube wall 8. This dimension may allow the monomer feed stream to achieve higher speeds at the inlet 5 of the preliminary polymerization reactor. In one or more embodiments, the annular section 4 of the apparatus advances 19-21 mm, for example 20 mm, into the preliminary polymerization reactor, as shown in FIG. 1.

As shown, the tube 1 which feeds the Ziegler-Natta catalyst system components into the preliminary polymerization reactor 6, extends about 10 mm less (such as 9-11 mm) than the outer tube of the annular section 4 through which the monomer is fed to the preliminary polymerization reactor 6.

As discussed above, the preliminary polymerization occurs without a pre-contact between the pro-catalyst and the catalyst activator, and without a pre-contact between the catalyst activator and monomer. Thus, in one or more embodiments it is envisioned that a plurality of apparatuses shown in FIG. 1 are used to feed different streams to the preliminary polymerization reactor. In a particular embodiment, a first apparatus is used to feed the Ziegler-Natta pro-catalyst of which the internal electron donor comprises a substituted phenylene aromatic diester, and a second apparatus is used to feed the catalyst activator and optionally the external electron donor. Monomer may be fed with each of the pro-catalyst and the catalyst activator.

According to the present invention, the apparatus does not allow the pre-contact between the streams of each apparatus before entering into the preliminary polymerization reactor. The apparatus also allows feeding the monomer without previous contact with the catalyst system components before entering into the preliminary polymerization reactor.

In an alternative embodiment, the catalyst system may be fed by using a combination of at least one of the apparatuses according to present invention and at least one additional feed tube, wherein a catalyst activator and propylene monomer are fed by means of the apparatus (that do not allow the pre-contact between the catalyst activator and the propylene monomer); and a stream comprising pro-catalyst and propylene monomer is fed by means of the feed tube. In such an embodiment, there is no pre-contact between the catalyst activator and the pro-catalyst.

In one or more embodiments, the propylene/pro-catalyst mass feed ratio may be in the range from 1 to 35 kg propylene per gram pro-catalyst, such as between a lower limit of any of 1, 2, 5, 10, or 15 kg propylene per gram pro-catalyst to an upper limit of any of 10, 15, 20, 25, 30, or 35 kg propylene per gram pro-catalyst, where any lower limit can be used in combination with any upper limit.

Preliminary Polymerization

The catalyst described herein may be fed to a preliminary polymerization process using propylene as monomer, and optionally with a $C_2$ or $C_4$-$C_{10}$ comonomer, such as ethylene, 1-butene, 1-hexene, 1-octene or a mixture thereof.

The preliminary polymerization may be carried out at liquid phase in a continuously operating reactor, operating in one, or more than one, preliminary polymerization reactor. Suitable preliminary polymerization reactors include a continuous stirred-tank reactor (CSTR), a loop reactor or tubular reactor. In particular embodiments, a loop reactor may be used.

The preliminary polymerization may be carried out at a temperature less than 10° C., such as between the range of 5 to 10° C. The pressure in the prepolymerization reactor is not critical but may be sufficiently high to maintain the reaction mixture in liquid phase. Thus, the pressure may be from 20 to 100 bar, for example from a lower limit of any of 20, 25, 30, or 35 bar to an upper limit of any of 65, 70, 80, 90, or 100 bar, where any lower limit can be used in combination with any upper limit.

The propylene/pro-catalyst mass ratio fed into the preliminary polymerization reactor may be in the range of 1 to 35 kg propylene per gram catalyst. The preliminary process may be carried out without feeding hydrogen, and the monomer feeding is a hydrogen-free monomer. A hydrogen-free monomer refers to a hydrogen concentration of no more than 20 ppm, or in more particular embodiments, no more than 15, 10, or 5 ppm hydrogen.

The preliminary polymerization may be carried out at an average residence time of less than 10 minutes, such as less than 10, 8, or 6 minutes, or such as between the range of 3 to 5 minutes.

The preliminary polymerization rate may be at less than 65 g PP/g Cat·min, such as between the range of a lower limit of any of 5, 10, or 15 g PP/g Cat min to an upper limit of any of 20, 30, 50, or 65 g PP/g Cat·min, where any lower limit can be used in combination with any upper limit. In some embodiments, the preliminary polymerization rate may be in the range of 10 to 20 g PP/g Cat·min (based on the pro-catalyst weight).

Further, as discussed above, in one or more embodiments the preliminary polymerization process may occur without a pre-contact step between the pro-catalyst and catalyst activator and without pre-contact step between the catalyst activator and monomer.

Preliminary Polymer

In one or more embodiments, the preliminary polymer formed from the preliminary polymerization using the Ziegler Natta catalyst system described above may have a weight average molecular weight (Mw) ranging from 100 kDa to 1600 kDa (such as having a lower limit ranging from any of 100, 200, or 400 kDa to an upper limit of any of 800, 1200, or 1600 kDa, where any lower limit can be used in combination with any upper limit), a number average molecular weight (Mn) ranging from 15 to 220 kDa (such as having a lower limit of any of 15, 30, or 50 kDa and upper limit of any of 175, 200, or 220 kDa, where any lower limit can be used in combination with any upper limit), and a molecular weight distribution (MWD: $M_w/M_n$) ranging from about 4.0 to 9.0, as measured by Gel Permeation Chromatography (such as ranging from a lower limit of any of 4.0, 4.5, or 5.0 to an upper limit of any of 7.0, 8.0, or 9.0, where any lower limit can be used in combination with any upper limit.).

In one or more embodiments, the preliminary polymer may have a crystallinity ($w_c$), measured by DSC, ranging from 35 to 55%.

In one or more embodiments, the propylene preliminary polymer may have an isotaticity, measured by XS-NMR, ranging from 92 to 97%.

In one or more embodiments, the preliminary polymer composition has a melting temperature (Tm) ranging from 159° C. to 163° C.

Polymerization

The preliminary polymer described herein may then be continuously fed to a polymerization reactor. The polymerization step may be carried out in a gas phase reactor or liquid phase reactor, using propylene and optionally with addition of $C_2$, $C_4$-$C_{10}$ alpha-olefin comonomers.

In one or more embodiments, the polymerization may occur in a gas phase reactor, resulting in a polymer with good morphology and high bulk density, avoiding the formation of fouling and decreasing the fines polymer particles generation. In one or more embodiments, the resulting polymer may have a bulk density of at least 400 kg/m$^3$, and a fines (i.e., less than 177 microns) content less than 3%.

METHODS AND EXAMPLES

Embodiments will now be illustrated from the following non-limiting examples.

The equipment and methodologies for determining the characteristics are also described in this section.

Definitions/Measuring Methods

Melt Flow Ratio (g/10 Min)

The Melt Flow Ratio (MFR) is measured according to ASTM D1238 (condition B). The equipment used to determine the flow rate is the plastometer. The flow rate is usually expressed in grams for ten minutes (g/10 min). Condition B is the method for sample with MFR value between 0.5 to 1500 g/10 min.

Granulometry

The propylene polymer granulometry is determined by sieving the polymer powder according to ASTM D1921 (test method A). As equipment, the method uses the "Ro-Tap and Coarse Models" sieve system or the "Granuteste" and "Produtest" sieve system. The set of sieves had openings of 3.360 mm, 2.00 mm, 1.140 mm, 1.00 mm, 0.850 mm, 0.350 mm, 0.250 mm, 0.180 mm, 0.150 mm, 0.125 mm, 0.106 mm and 0.075 mm.

Polymer Bulk Density (g/cm$^3$)

The bulk density (BD) of the polymer powder is determined according to ASTM D1895-96.

Stereo Microscopy

The stereo microscope is an optical microscope variant designed for low Magnification observation of a sample; typically using light reflected from the surface of an object rather than transmitted through it. The analysis is carried out using a stereo microscope, model Leica M205C, employing incident light and different magnifications. The powder samples are placed on a glass slide, and the similarities and differences between the polymer particles are verified.

Scanning Electron Microscopy (SEM)

Sample surface topography and composition can be determined by scanning electron microscopy. In this study, it is used to obtain morphological data. To obtain the morphology of samples, the particles are placed on carbon tape. The image is obtained using a SEM (TM-100 from Hitachi) using accelerating voltages of 15 keV and backscattering detector.

Medium Particle Size [D(0.5)] & Particle Size Distribution [SPAN]

The particle size distribution of powdered materials is obtained by laser beam deflection, using the Malvern Mastersizer 2000 equipment, equipped with the Hydro 2000S and Scirocco 2000 sample dispersion accessories.

The Mastersizer is operated using an optical unit that captures the actual light diffusion pattern in a particle field (sample), then calculates the size of the particles that create that pattern.

The analysis of the determination of the average particle diameter is performed in a wet mode where the solvent was isoparaffin and the amount of polymer sample used is an amount between 3 and 20% of obscuration given by the equipment. As used herein:

D(0.5) is the size in microns at which 50 vol % of the sample is smaller and 50% is larger. This value is also known as the Mass Median Diameter (MMD) or the median of the volume distribution.

D(0.1) is the size of particle below which 10 vol % of the sample lies.

D(0.9) is the size of particle below which 90 vol % of the sample lies.

SPAN is the measurement of the width of the distribution. The narrower the distribution, the smaller the span becomes. The span is calculated as:

$$SPAN = [D(0.9) - D(0.1)] / D(0.5)$$

Xylene Soluble-Nuclear Magnetic Resonance Spectroscopy (XS-NMR)

Determination applied to the characterization of Xylene Soluble is by NMR, according to ASTM D5492. An amount of polymer sample, usually in the form of a sphere/powder is placed in an analysis tube and conditioned to the temperature of the magnet. The prediction of the XS-RMN result is automatic after the selection of the pre-programmed method/macro in the appropriate software of the equipment. An instrument of H1-RMN Auburn, Magneflow series, model MR-2000 is used.

The polymer sample is disposed in the test chamber (probe), where a strong static magnetic field (4700 Gauss nominal) polarizes the hydrogen atoms in the sample. The sample is then irradiated with a short radio frequency pulse (20 MHz nominal) that inclines the magnetization of the proton 90° perpendicular to the direction of the applied static field, direction along which the device detects the signal. After the radio, frequency is turned off and the proton magnetization that becomes detectable starts to decay. The decaying magnetic resonance signal is described as a free induction decay (FID) and the instrument registers this digitized signal. The magnetized protons in the crystalline and amorphous domains decompose with different time constants.

N2 Adsorption/Desorption Experiments

N2 adsorption isotherms are performed on a Micromeritics Gemini 2375. The samples are pre-heated at 80° C. for 24 hours under vacuum. The surface area is determined using the Brunauer-Emmett-Teller (BET) at 77.4 K in the range $0.01 < P/Patm < 0.35$. The average diameter of mesopores and their distribution are calculated using the Barrett-Joyner-Halenda (BJH) standards Halsey considering the desorption isotherm. The micropore volume is calculated using the desorption isotherm and the t-plot and isotherm pattern of Harkins and Jura.

Gel Permeation Chromatography (GPC)

Molecular Weight Distribution (MWD) Molecular weight distribution (MWD) are determined by Gel Permeation Chromatography (GPC) according to ISO 16014-4:2003 and ASTM D 6474-99. A Waters GPC2000 instrument, equipped with heated flow cell (at 140° C.) connected via a heated transfer line (at 140° C.) was used with 2x Olexis and 1x Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a mercury cadmium telluride (MCT) detector. The MCT detector is cooled with liquid nitrogen. The column set is calibrated using universal calibration (according to ISO 16014-2:2003) with at least 15 narrow MWD polystyrene (PS) standards in the range of 0.6 kg/mol to 6000 kg/mol. Mark Houwink constants for PS, PE and PP used are as per ASTM D 6474-99. All samples are prepared by dissolving 4.0-8.0 mg of polymer in 4 mL (at 140° C.) of stabilized TCB (stabilized with 250 mg/L of butylated hydroxytoluene—BHT) and keeping for max 3 hours at max 160° C. with continuously gentle shaking prior sampling into the GPC instrument. The data is imported into Polymer Laboratories Cirrus V3.1 software, and the evaluation towards molecular weights and molecular weight distribution is performed with this software.

Differential Scanning Calorimetry (DSC)

This procedure is used to determine the degree of crystallinity of the polymer. This technique measures the difference in energy supplied to the substance and to a reference material as a function of temperature or time, while the substance and reference material are subjected to a controlled temperature program.

The sample, previously weighing 6 mg±1 mg is packed in an appropriate pot, and then placed in the DSC cell, on the front plateau and the reference on the back plateau (empty pot). The cell should be closed and a purge gas flow of approximately 50 mL/min should be imposed. The analysis must be initiated through the software referring to the equipment command, being used the TA Instruments—Q 2000 equipment.

Atomic Absorption Spectrometry (AAS)

This method is used for the quantitative determination of magnesium in preliminary polymer samples. For the method, the atomic absorption spectrophotometer AA 50 B from Varian is used with SpectrAA software.

The method is based on the calcination of the sample, subsequent solubilization of the residues and determination of the concentration of the metal present in the sample by atomic absorption spectrometry. Approximately 0.2 g of sample is calcined in a microwave oven at 800° C. for 10 minutes and then mixed with 5 mL of 2:1 HCl solution and 5 mL of deionized water. 10 mL of SrCl2 ionizing agent is added. After diluting the solution, the magnesium concentration in the sample is determined by atomic absorption spectrometry using the Air-Acetylene burner. The results of the atomic absorption spectrometer use the values of the calibration curve as reference, being expressed in ppm.

Total Ethylene and Ethylene in Amorphous

The ethylene content, expressed as a percentage of the total sample and the amorphous fraction, is performed with the Fourier Transform Infrared Spectroscopy (FTIR) technique. The samples were analyzed after pressing at 175° C. by transmission on the Thermo Scientific equipment, model Nicolet iS50, and analyzed between 4,700 to 400 $cm^{-1}$ wave numbers and 4 $cm^{-1}$ resolution. The quantification of the ethylene content was performed using specific calibration curves for each of the fractions of the sample, with standards with different concentrations of ethylene validated by the NMR technique. The calibration curve for the quantification of the total ethene content was performed by integrating the band positioned between 775 and 670 $cm^{-1}$, standardized by the band thickness between 4,482 and 3,950 $cm^{-1}$. And the calibration curve for the quantification of the ethene content in the amorphous fraction was performed by means of the ratio of the band areas between 782 and 654 $cm^{-1}$ and 1,194 and 1,115 $cm^{-1}$.

EXAMPLES

Example 1

50 mg of a high activity Ziegler Natta catalyst containing substituted phenylene aromatic diester as an internal donor were precontacted with tri-ethylaluminum co-catalyst and n-propyltrimethoxysilane as external donor in 75 mL of hexane for 10 minutes at room temperature. The precontacted mixture was transferred to a 1 gallon steel bench scale reactor. After introducing the catalytic system, 1.2 kg of propylene at room temperature was added to the reactor. Upon stirring at 600 rpm, the mixture was cooled at a temperature of 20° C. and maintained for 15 minutes. In the stirred reactor the conditions of Table 1 were satisfied.

TABLE 1

| Conditions of Examples 1-2 | |
|---|---|
| Al/Ti (molar) | 400 |
| Al/Do (molar) | 20 |
| Temperature (° C.) | 20 |
| Batch time (min) | 15 |

After 15 minutes, the reaction was interrupted through the dosage of 3.1 g of CO2 using high pressure nitrogen as carrier. The reactor was depressurized to remove unreacted propylene. The preliminary polymerization rate was 90.6 gPP/gcatalyst·min. The obtained prepolymer has d(0.5) of 159.8 microns. The prepolymer morphology can be observed in FIG. 3.

Example 2

50 mg of a high activity Ziegler Natta catalyst containing substituted phenylene aromatic diester as an internal donor were introduced in the 1 gallon steel bench scale reactor using 75 ml of hexane as carrier. Tri-ethylaluminum as co-catalyst and n-propyltrimethoxysilane as external donor were added with 1.2 kg of propylene as carrier and reaction monomer at room temperature. Upon stirring at 600 rpm, the mixture was cooled at a temperature of 20° C. and maintained for 15 minutes. In the stirred reactor the conditions of Table 1 above were satisfied.

After 15 minutes, the reaction was interrupted through the dosage of 3.1 g of CO2 using high pressure nitrogen as carrier. The reactor was depressurized to remove unreacted propylene. The preliminary polymerization rate was 82.7 gPP/gcatalyst·min. The obtained prepolymer has d(0.5) of 138.4 microns. The prepolymer morphology can be observed in FIG. 4.

Figure 3:
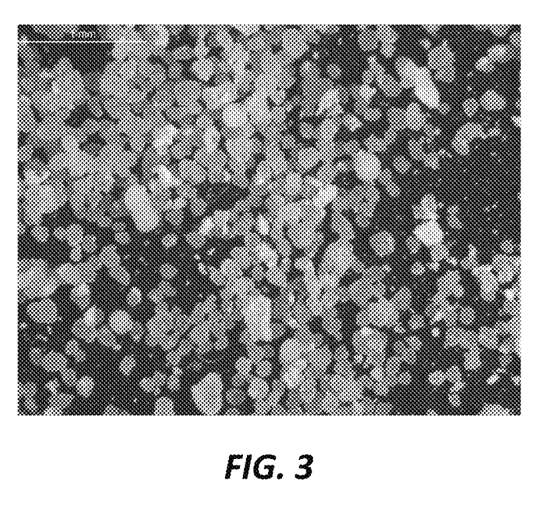
FIG. 3 shows a micrograph of prepolymer obtained through bulk preliminary polymerization with pre-contact according to Example 1.
Figure 4:
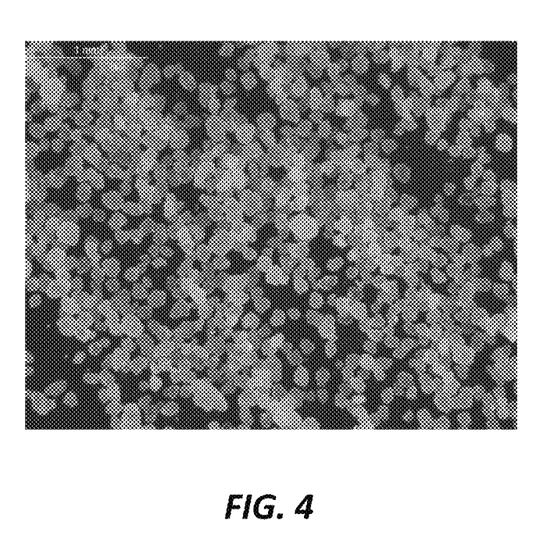
FIG. 4 shows a micrograph of prepolymer obtained in the bulk preliminary polymerization without pre-contact according to Example 2.

Under same prepolymerization conditions, except the precontact step, it is possible to observe an improvement in the prepolymer morphology comparing FIG. 3 and FIG. 4 2.

Example 3

Example 2 procedure was repeated except the preliminary polymerization batch time was 5 minutes according to Table 2 and 3.

Example 4

Example 2 procedure was repeated except the preliminary polymerization temperature was 5° C. and batch time was 5 min according to Table 2 and 3.

Example 5

Example 2 procedure was repeated except the preliminary polymerization temperature was 5° C. and batch time was 15 min according to Table 2 and 3.

Example 6

Example 2 procedure was repeated except the preliminary polymerization temperature was 12.5° C. and batch time was 10 min according to Table 2 and 3.

Example 7

Example 2 procedure was repeated except the preliminary polymerization temperature was 10° C. and batch time was 3 min according to Table 2 and 3.

Example 8

Example 2 procedure was repeated except the preliminary polymerization temperature was 5° C. and batch time was 3 min according to Table 2 and 3.

Example 9

Example 2 procedure was repeated except the preliminary polymerization temperature was 10° C. and batch time was 5 min according to Table 2 and 3.

TABLE 2

| Conditions of Examples 3-9 | | | |
|---|---|---|---|
| | Batch time (min) | Temperature (° C.) | Preliminary polymerization rate (gPP/gcat.min) |
| Example 3 | 5 | 20 | 110 |
| Example 4 | 5 | 5 | 32.8 |
| Example 5 | 15 | 5 | 33.3 |
| Example 6 | 10 | 12.5 | 48.5 |

TABLE 2-continued

Conditions of Examples 3-9

|  | Batch time (min) | Temperature (° C.) | Preliminary polymerization rate (gPP/gcat.min) |
|---|---|---|---|
| Example 7 | 3 | 10 | 58.3 |
| Example 8 | 3 | 5 | 35 |
| Example 9 | 5 | 10 | 63.8 |

TABLE 3

Prepolymer properties of Examples 3-9

|  | Mn (kDa) | Mw (kDa) | Mw/Mn | Tm (° C.) | wc (%) | XS (%) | d (0.5) microns |
|---|---|---|---|---|---|---|---|
| Example 3 | — | — | — | — | — | — | 118.2 |
| Example 4 | 203.8 | 1528 | 7.5 | 159 | 41.3 | 6.42 | 103.5 |
| Example 5 | — | — | — | — | — | — | 147.1 |
| Example 6 | — | — | — | — | — | — | 101.5 |
| Example 7 | 167.8 | 1384 | 8.25 | 159.4 | 40.6 | 6.07 | 100.02 |
| Example 8 | 180.7 | 1465.9 | 8.11 | 159.5 | 37.4 | 6.12 | 100.3 |
| Example 9 | 212.9 | 1567.1 | 7.36 | 159.4 | 25 | 4.35 | 99.4 |

Example 10

25 kg/h of homopolymer polypropylene (PP) is prepared by polymerizing the propylene in gas phase, using a high activity Ziegler Natta catalyst containing substituted phenylene aromatic diester as an internal donor, tri-ethylaluminum as co-catalyst and n-propyltrimethoxysilane as external donor, in the presence of hydrogen as a molecular weight regulator and nitrogen as inert diluent. In the fluidized bed of the gas phase reactor, the operative conditions of Table 4 are satisfied.

TABLE 4

Conditions of Examples 10

| Al/Ti (molar) | 57 |
|---|---|
| Al/Do (molar) | 7.7 |
| Temperature (° C.) | 60 to 80 |
| Residence time | to 3 hours |
| Pressure (barg) | 20 to 40 |
| Propylene partial pressure (bar) | 15 to 30 |
| H2/C3 (molar) | 0.001 to 0.010 |

The catalyst mileage was 31.7 kgPP/gcat based on the production rate and catalyst flowrate. The obtained PP has a Melt Flow Index at 230° C. of 2 g/10', bulk density of 0.35 g/cm$^3$, xylene soluble of 4.6%, fines content of 3% (<125 microns) and d(0.5) of 405 microns.

Example 11

25 kg/h of homopolymer polypropylene (PP) is prepared by performing a preliminary polymerization in which is added a high activity Ziegler Natta catalyst containing substituted phenylene aromatic diester as an internal donor, tri-ethylaluminum as co-catalyst, n-propyltrimethoxysilane as external donor and liquid propylene. The catalyst, co-catalyst and external donor are not precontacted before entering the preliminary polymerization reactor. The preliminary polymerization is conducted in a CSTR reactor that operates full of liquid propylene. Subsequently, the mixture of prepolymer, tri-ethylaluminum as co-catalyst, n-propyltrimethoxysilane as external donor and liquid propylene is forward to the gas phase reactor in which the polymerization is carried out in the presence of hydrogen as a molecular weight regulator and nitrogen as inert diluent. In the preliminary polymerization reactor and in the fluidized bed of the gas phase reactor, the operative conditions of Table 5 are satisfied.

TABLE 5

Conditions of Examples 11

|  | Preliminary polymerization reactor | Gas phase reactor |
|---|---|---|
| Al/Ti (molar) | 46.5 | — |
| Al/Do (molar) | 6.3 | — |
| Temperature (° C.) | 9.2 | 60 to 80 |
| Residence time | 5.2 min | 0.5 to 3 hours |
| Pressure (barg) | — | 20 to 40 |
| Propylene partial pressure (bar) | — | 15 to 30 |
| H2/C3 (molar) | no hydrogen | 0.001 to 0.010 |

Figure 5:
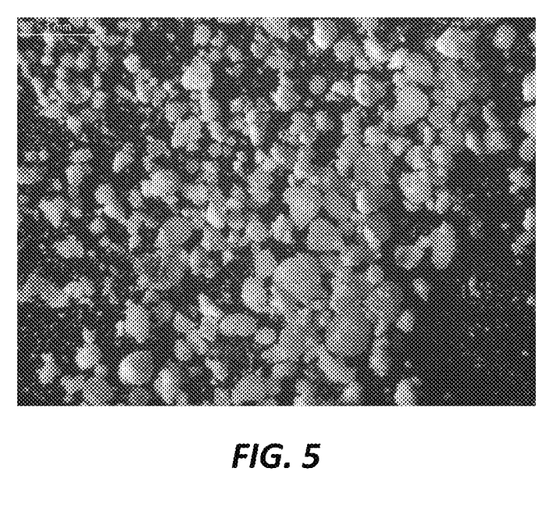
FIG. 5 shows a micrograph of prepolymer obtained in the preliminary polymerization reactor in the pilot plant according to Example 11.

The preliminary polymerization rate was 30.7 gPP/gcat·min and the d(0.5) of 152.9 microns. Micrograph of the prepolymer is in FIG. 5.

The catalyst mileage was 45.3 kgPP/gcat based on the production rate and catalyst flowrate. The obtained PP has a Melt Flow Index at 230° C. of 2.3 g/10', bulk density of 0.41 g/cm$^3$, xylene soluble of 3.7%, fines content of 2.1% (<125 microns) and d(0.5) of 438 microns.

Example 12

25 kg/h of random copolymer polypropylene (RCP) is prepared by performing a preliminary polymerization in which is added a high activity Ziegler Natta catalyst containing substituted phenylene aromatic diester as an internal donor, tri-ethylaluminum as co-catalyst, n-propyltrimethoxysilane as external donor and liquid propylene. The catalyst, co-catalyst and external donor are not precontacted before entering the preliminary polymerization reactor. The preliminary polymerization is conducted in a CSTR reactor that operates full of liquid propylene. Subsequently, the mixture of prepolymer, tri-ethylaluminum as co-catalyst, n-propyltrimethoxysilane as external donor and liquid propylene is forward to the gas phase reactor in which the polymerization is carried out in the presence of hydrogen as a molecular weight regulator, ethylene as comonomer and nitrogen as inert diluent. In the preliminary polymerization reactor and in the fluidized bed of the gas phase reactor, the operative conditions of Table 6 are satisfied.

TABLE 6

Conditions of Examples 12

|  | Preliminary polymerization reactor | Gas phase reactor |
|---|---|---|
| Al/Ti (molar) | 70 | — |
| Al/Do (molar) | 5.5 | — |
| Temperature (° C.) | 7 | 60 to 80 |
| Residence time | 5 min | 0.5 to 3 hours |

TABLE 6-continued

Conditions of Examples 12

| | Preliminary polymerization reactor | Gas phase reactor |
|---|---|---|
| Pressure (barg) | — | 20 to 40 |
| Propylene partial pressure (bar) | — | 15 to 30 |
| H2/C3 (molar) | no hydrogen | 0.01 to 0.1 |
| C2/C3 (molar) | no ethylene | 0.005 to 0.01 |

The obtained RCP has a Melt Flow Index at 230° C. of 10 g/10' and xylene soluble of 6.5%. The preliminary polymerization rate and d(0.5) is according to Table 7 below. The overall catalyst mileage and RCP morphological properties is according to Table 8 below.

Example 13

Example 12 procedure was repeated except the preliminary polymerization temperature was 7° C. and batch time was 3 min according to Table 7 and 8.

Example 14

Figure 6:
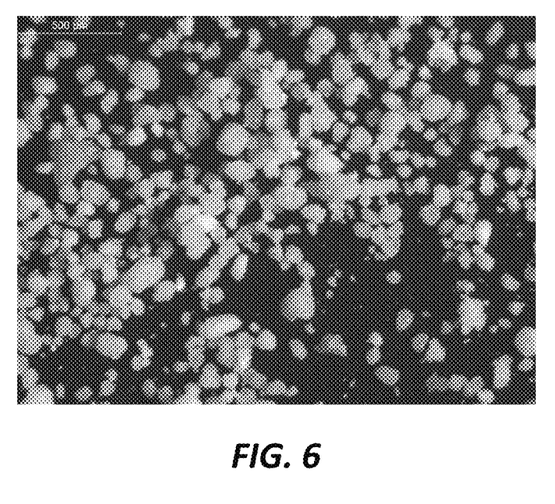
FIG. 6 shows a micrograph of prepolymer obtained in the preliminary polymerization reactor in the pilot plant according to Example 14.
Figure 7:
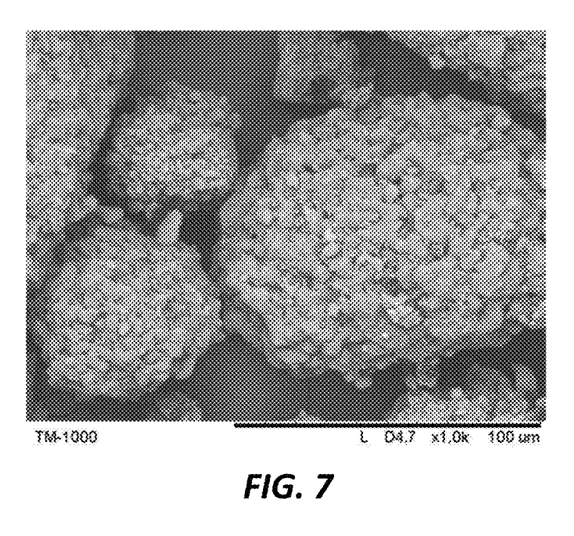
FIG. 7 shows a SEM prepolymer image according to Example 14.

Example 12 procedure was repeated except the preliminary polymerization temperature was 5° C. and batch time was 5 min according to Tables 7 and 8. Micrograph of the prepolymer is in FIG. 6. SEM image of prepolymer is in FIG. 7.

Example 15

Example 12 procedure was repeated except the preliminary polymerization temperature was 5° C. and batch time was 3 min according to Table 7 and 8.

TABLE 7

Conditions of Examples 12-15 for preliminary polymerization

| | Residence time (min) | Temperature (° C.) | Preliminary polymerization rate (gPP/gcat.min) | d (0.5) microns |
|---|---|---|---|---|
| Example 12 | 5 | 7 | 17 | 98.7 |
| Example 13 | 3 | 7 | 19.6 | 92.4 |
| Example 14 | 5 | 5 | 15.8 | 96.8 |
| Example 15 | 3 | 5 | 10.9 | 90.4 |

TABLE 8

Conditions of Examples 12-15 forRCP

| | Catalyst mileage (kgPP/gcat) | Bulk density (g/cm$^3$) | Fines (<125 microns) | d (0.5) microns |
|---|---|---|---|---|
| Example 12 | 87.3 | 0.405 | 0.21% | 604 |
| Example 13 | 82.7 | 0.401 | 0.24% | 609 |
| Example 14 | 77.9 | 0.41 | 0.05% | 608 |
| Example 15 | 101.6 | 0.41 | 0.05% | 593 |

Example 16

In this example, the computational fluid dynamics (CFD) was applied simulating a specific apparatus for adding a mixture of tri-ethylaluminum as catalyst activator and n-propyltrimethoxysilane as external donor through the feed tube into the preliminary polymerization reactor. The mathematical modeling used considered multiphase, turbulent, isothermal and non-reactive flow. The propylene is the reaction monomer and enters into the apparatus from the side at mass flowrate of 507 kg/h at −5° C. and 42 kgf/cm$^2$ g. The mass flowrate of tri-ethylaluminum and n-propyltrimethoxysilane was respectively 5.32 kg/h and 0.97 kg/h at 20° C. and 42 kgf/cm$^2$ g. The preliminary polymerization reactor was at 5° C. and 30 kgf/cm$^2$ g. The specific apparatus just enables the contact of catalyst activator with monomer inside the preliminary polymerization reactor. The specific apparatus has an annular section with a distance from 1.0 to 2.0 mm between the inner tube wall and the external tube wall. The external tube of the annular section advances 20 mm into the preliminary polymerization reactor. The internal tube of the annular section advances 10 mm less than the external tube of the annular section.

Example 17

Example 16 was repeated except the propylene flowrate was reduced to 338 kg/h.

Example 18

Example 16 was repeated except the propylene flowrate was reduced to 253.5 kg/h.

Example 19

Example 16 was repeated except the propylene flowrate was reduced to 169 kg/h.

Under same conditions at Examples 16-19, except the flowrate of propylene, it is possible to observe that as the flow of propylene decreases, the capacity to inject tri-ethylaluminum and n-propyltrimethoxysilane mixture into the reactor also decreases due to lower velocity that is not enable to fully penetrate the reactor flow which cause recirculation from the prepolymerization reactor fluid to the apparatus nozzle. This can cause obstruction since the reactor operates with a high active catalyst and this region is concentrated in catalyst activator. Just above the apparatus conical part inserted in the reactor, there is a low-pressure region in which can have catalyst activator and donor deposition if injected at low velocity causing reactor fouling.

In Examples 16 and 17, the catalyst activator and external donor have enough kinetic energy to penetrate the reactor indicating good dispersion. In Examples 18 and 19, the injection velocity is not enough to overcome the reactor flow and there is recirculation of tri-ethylaluminum and n-propyltrimethoxysilane to close to the reactor walls.

Figure 8:
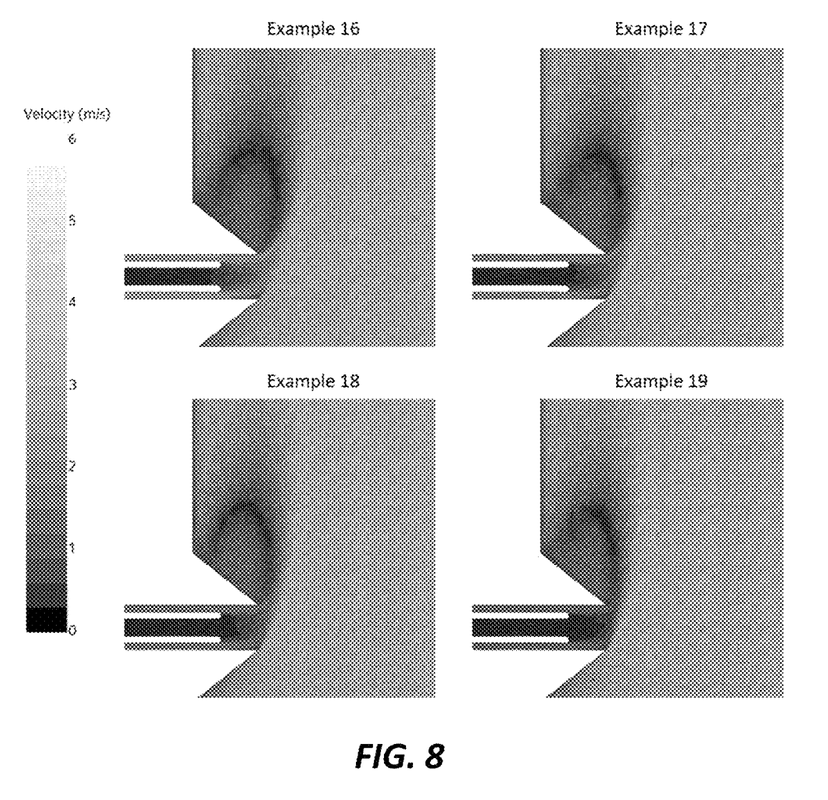
FIG. 8 shows the velocity profile for the ejection of catalyst activator and donor into the preliminary polymerization reactor.
Figure 9:
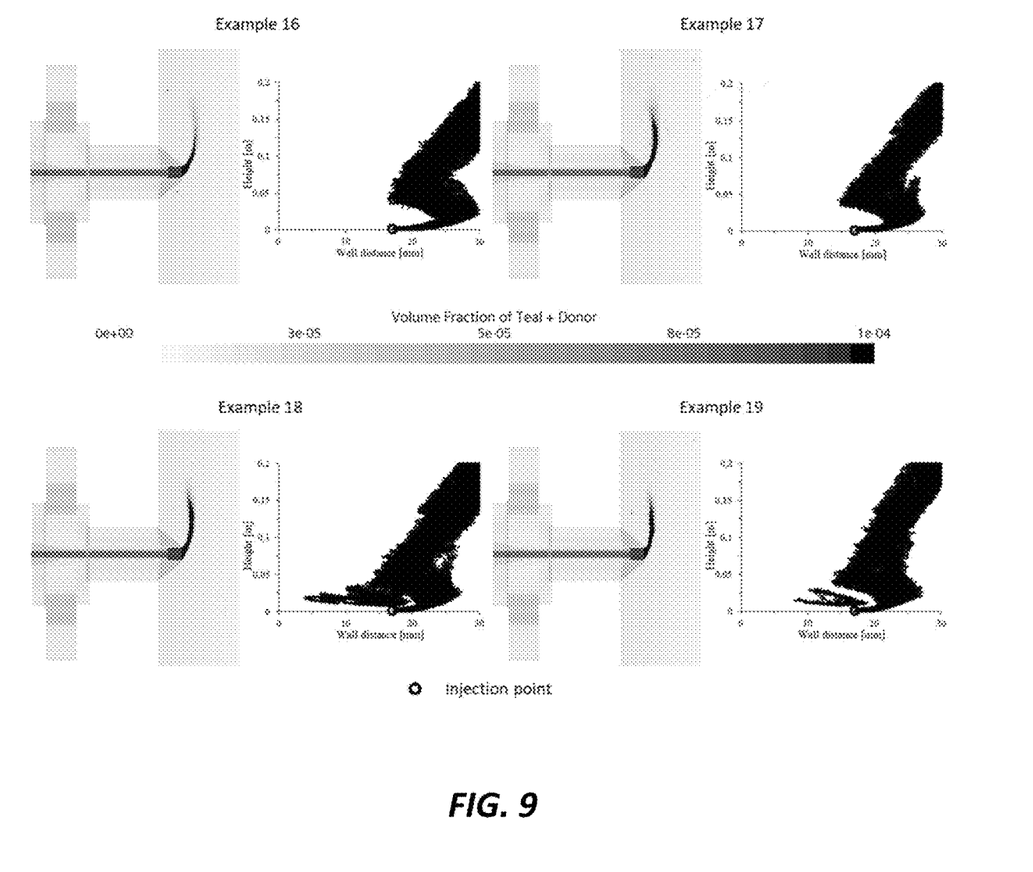
FIG. 9 shows a catalyst activator and external donor mixture distance from the prepolymerization reactor walls.

Velocity profile for the ejection of tri-ethylaluminum and n-propyltrimethoxysilane is shown in FIG. 8. The return of tri-ethylaluminum and n-propyltrimethoxysilane to the reactor walls due to recirculation is shown in FIG. 9.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A process for propylene bulk preliminary polymerization, comprising:
    feeding propylene monomer and a Ziegler-Natta catalyst system comprising (a) a pro-catalyst having an internal electron donor comprising a substituted phenylene aromatic diester and (b) a catalyst activator, into a continuous loop preliminary polymerization reactor that comprises a feeding apparatus connected thereto, configured to feed propylene monomer and the Ziegler-Natta catalyst system into the continuous loop preliminary polymerization reactor,
    wherein the feeding apparatus is configured to carry out said feeding without pre-contact of the pro-catalyst with the catalyst activator, and also without pre-contact of the catalyst activator with the propylene monomer before entering the continuous loop preliminary polymerization reactor,
    wherein the propylene monomer and the Ziegler-Natta catalyst system, when in the continuous loop preliminary polymerization reactor, are in a liquid medium that is passed through the continuous loop preliminary polymerization reactor, and
    wherein the process is carried out in the absence of, and the liquid medium does not have, saturated hydrocarbon diluent.

2. The process of claim 1, wherein the pro-catalyst is suspended in mineral oil, has total intrusion volume less than or equal to 1 mL/g, total pore area less than or equal to 10 $m^2/g$, and apparent skeletal density 1.6 to 2.1 g/ml.

3. The process of claim 1, wherein a molar ratio of aluminum to titanium (Al/Ti) in the pro-catalyst and catalyst activator is from about 50:1 to about 200:1.

4. The process of claim 1, wherein the preliminary polymerization is carried out without feeding hydrogen, and fed monomer has hydrogen concentration of no more than 20 ppm.

5. The process of claim 1, wherein the propylene/pro-catalyst mass feed ratio is in the range from 1 to 35 kg propylene per gram pro-catalyst.

6. The process of claim 1, wherein an average residence time of the preliminary polymerization is from 3 to 5 minutes.

7. The process of claim 1, wherein a temperature of the preliminary polymerization is from 0 to 10° C.

8. The process of claim 1, wherein a preliminary polymerization rate is from 10 to 65 g PP/g Catalyst·min.

9. The process of claim 1, wherein a preliminary polymerization rate is from 10 to 20 g PP/g Catalyst·min.

10. The process of claim 1, wherein the preliminary polymerization reactor comprises a feeding zone having:
    a maximum polymer concentration at least 58% lower than the maximum polymer concentration in the preliminary polymerization reactor;
    a maximum Ziegler-Natta catalyst concentration at least 58% lower than the maximum Ziegler-Natta catalyst concentration in the preliminary polymerization reactor; and
    a maximum temperature at least 47% lower than the maximum temperature in the preliminary polymerization reactor.

11. The process of claim 1, wherein an inlet velocity of the pro-catalyst is between 2 to 5 m/s.

12. The process of claim 1, wherein the feeding apparatus comprises a first feeding tube and a second feeding tube, the feeding is carried out by passing the propylene monomer through the first feeding tube, and by passing the pro-catalyst and catalyst activator through the second feeding tube, wherein the first feeding tube and the second feeding tube are separated by an inner tube wall.

13. The process of claim 12, wherein the first feeding tube comprises grooves that are configured to increase turbulent flow of the propylene monomer through the first feeding tube.

14. The process of claim 12, wherein the first feeding tube comprises grooves that are configured to increase turbulent flow of the propylene monomer through the first feeding tube, and wherein turbulent flow of the propylene monomer comprises a vortex flow.

15. The process of claim 1, wherein the continuous loop preliminary polymerization reactor does not have an agitator.

16. The process of claim 12, wherein the preliminary polymerization reactor comprises a feeding zone, wherein the each of the first feeding tube and the second feeding tube comprises an exit region, each exit region in fluid communication with the feeding zone, wherein the feeding zone of the preliminary polymerization reactor has:
    a maximum polymer concentration at least 58% lower than the maximum polymer concentration in the preliminary polymerization reactor;
    a maximum Ziegler-Natta catalyst concentration at least 58% lower than the maximum Ziegler-Natta catalyst concentration in the preliminary polymerization reactor; and
    a maximum temperature at least 47% lower than the maximum temperature in the preliminary polymerization reactor.

17. A process for propylene bulk preliminary polymerization, comprising:
    feeding propylene monomer and a Ziegler-Natta catalyst system comprising (a) a pro-catalyst having an internal electron donor comprising a substituted phenylene aromatic diester and (b) a catalyst activator, into a continuous stirred-tank preliminary polymerization reactor that comprises a feeding apparatus connected thereto, configured to feed propylene monomer and the Ziegler-Natta catalyst system into the continuous stirred-tank preliminary polymerization reactor,
    wherein the feeding apparatus is configured to carry out said feeding without pre-contact of the pro-catalyst with the catalyst activator, and also without pre-contact of the catalyst activator with the propylene monomer before entering the continuous stirred-tank preliminary polymerization reactor,
    wherein the propylene monomer and the Ziegler-Natta catalyst system, when in the continuous stirred-tank preliminary polymerization reactor, are in a liquid medium that is passed through the continuous stirred-tank preliminary polymerization reactor, and
    wherein the process is carried out in the absence of, and the liquid medium does not have, saturated hydrocarbon diluent.

* * * * *